Inventor
R. MURAKAMI -
H. KANEKO
By
Attorney

United States Patent Office 3,419,819
Patented Dec. 31, 1968

3,419,819
ENCODER MEANS HAVING TEMPERATURE-COMPENSATION APPARATUS INCLUDED THEREIN
Ryuichi Murakami and Haruo Kaneko, Tokyo, Japan, assignors to Nippon Electric Company, Limited, Tokyo, Japan, a corporation of Japan
Filed Oct. 18, 1965, Ser. No. 497,032
Claims priority, application Japan, Oct. 19, 1964, 39/59,377
7 Claims. (Cl. 332—9)

ABSTRACT OF THE DISCLOSURE

Encoder means is provided, in accordance with this invention, with apparatus for compensating the encoder for ambient temperature variations. The compensating apparatus may take the form, according to an embodiment of this invention, of a biasing circuit which not only compensates the characteristic of the holding circuitry included in such encoder means for temperature variations but in addition thereto compensates for the direct-current drift introduced by such temperature variations.

---

This invention relates to a temperature-compensated encoder which compensates for variations caused by variations of ambient temperature, of the encoding characteristics of an encoder which is used in pulse-code-modulation (hereafter abbriviated as PCM) communication, more particularly, this invention relates to a temperature compensated PCM encoder of the kind having a holding circuit.

In pulse-code-modulation communication, the information signal to be transmitted is sampled at predetermined periods to provide samples having instantaneous amplitudes. Each sample is sequentially encoded into a permutation-code group of generally N time-sequential binary pulses (where N is the number of digits). Many types of encoders have been proposed for such pulse-code modulation. These proposed encoders may be grouped into four different types: the counting type, the parallel or the simultaneous-recognition type, the serial of the sequential-recognition type, and the miscellaneous type. For example: the counting type is described by H. S. Black and J. O. Edson in their article, "PCM Equipment," in Electrical Engineering, vol. 66 (November 1947); the parallel type, by W. M. Goodall in his article, "Television by Pulse Code Modulation," in Bell System Technical Journal (January 1951); and the sequential type, by W. M. Goodall in his article, "Telephony by Pulse Code Modulation," in Bell System Technical Journal (July 1947), and also by B. D. Smith in his article, "Coding by Feedback Method," in Proceedings of the Institute of Radio Engineers (January 1948). The encoders included in the miscellaneous category includes all the various other types of encoders being developed. One such development is revealed in U.S. Patent No. 2,876,418, entitled "Encoder for Pulse Code Modulation."

The present invention is concerned with temperature compensation for encoders having a holding circuit, such as a sequential-type encoder. The sequential-type encoder makes a series of comparison between each of the samples to be encoded and a set of reference values and derives one digit of a code group for each comparision The comparison begins with the most significant digit and is repeated N times. After each comparison, the information concerning the sign of the error signal dervied by the comparison is fed back. Consequently, encoders of the type include a holding circuit for storing the sample during the time interval required for completing the encoding. The encoding of the sample is achieved by comparing at every time point of comparison, the output of the holding circuit with the output of a local decoder which is derived from a reference voltage.

According to this invention, the holding circuit used, for example, in a sequential-type encoder, is equipped with a novel temperature-compensation bias circuit. The simple, novel circuit of this invention not only compensates for the temperature variations in the characteristics of the holding circuit which includes active circuit elements but also compensates for the direct-current drift introduced by temperature variations of the reference level of the entire encoder. This invention it should be noted, also can compensate for the level variations introduced into the encoded signal by the temperature characteristics of the local decoder.

An object of this invention, therefore, is to provide a temperature compensated PCM encoder which is provided with a holding circuit.

Another object of this invention is to provide a temperature compensated sequential encoder having a holding circuit which compensates for changes resulting from heat generated by active elements as well as D.C. drift of the entire encoder.

The above-mentioned and other features and objects of this invention and the means for attaining them will become more apparent and the invention itself will be best understood by reference to the following description of embodiments of the invention taken in conjunction with the accompanying drawings in which.

Figure 1:
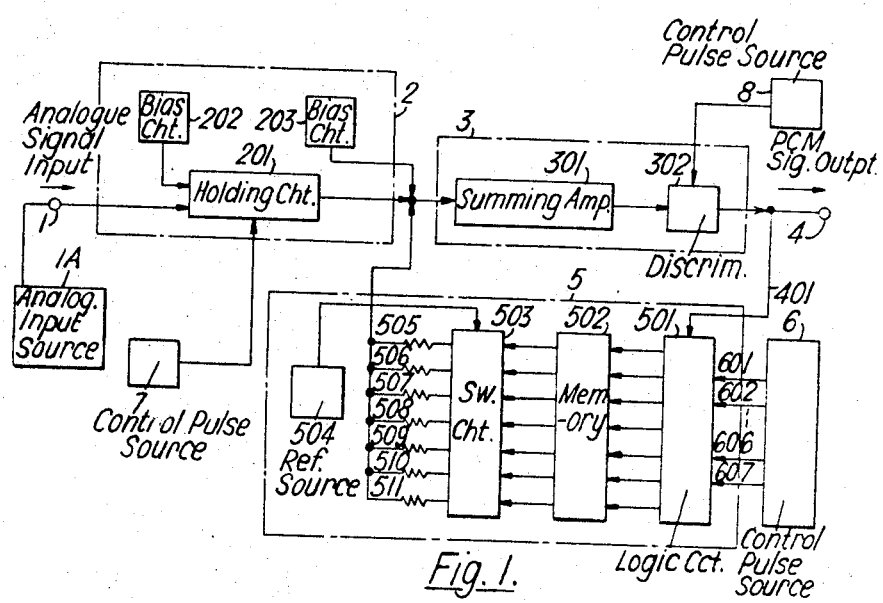
FIG. 1 is a block diagram of a sequential-type encoder which illustrates this invention.

Referring to FIG. 1, there is illustrated therein an embodiment of a sequential-type encoder according to this invention. The illustrated encoder is a quantization-feedback or sequential-comparison type encoder. The principles of operation of quantization feedback-type encoders are disclosed by B. D. Smith in "Proceedings of the Institute of Radio Engineers," August 1953, and will be described in detail herein only insofar as required for the complete understanding of the instant invention.

In FIG. 1, the analogue signal which is to be converted into a digital signal is supplied from source 1A to an input terminal 1 of the encoder. The input analogue signal may be either a conventional analogue signal or a time-division-multiplexed PAM signal. Blocks 6, 7, and 8 are control-pulse sources, which supply control-pulse trains required in the encoding operation: circuit 6 generates digit-pulse trains; circuit 7 generates a holding-pulse train which controls the writing-in of the samples into the holding circuit; and circuit 8 generates a clock-pulse train. Block 2 illustrates a holding-and-compensation circuit which includes: a holding circuit 201 composed of a sampling circuit for sampling the input analogue signal and a memory circuit for storing the samples of the input analogue signal; a first bias circuit 202 which, as the temperature-compensation circuit, is the most important part in the present invention; and, if needed, a second bias circuit 203 which serves for any subsidiary purposes. The holding-and-compensation circuit 2 contains the inventive concept of the instant invention, and any circuit which functions as does circuit 2 will hereinafter be called a temperature-compensated holding circuit. The sampling circuit contained in the holding circuit 201 is controlled by the holding-pulse train supplied from the control-pulse source 7. When the signal supplied to the input terminal 1 is a time-division-multiplexed PAM signal (which has already been sampled in effect) then circuit 201 serves solely as a writing-in circuit. When the input analogue signal is a conventional one, then circuit 201 not only controls "write-in" but also has a sampling circuit. As is known in the art, the repetition frequency of the holding pulses supplied from control-pulse source 7 must be (when the input analogue signal is the conventional one) at least twice the maximum frequency of the input signal. When the input analogue signal is the PAM signal, the repetition frequency of the holding pulses must be equal to the repetition frequency of the pulses of the input PAM signal and in synchronism with said PAM pulses. The memory circuit contained in the holding circuit 201 can be any one of a number of known circuits. One known circuit uses the charge and discharge of a capacitor. This known circuit is widely adopted because of its simplicity and utility. In view of the fact that a holding circuit must contain active elements to operate properly, the present invention provides novel means for compensating for the undesired temperature variation of the encoder characteristics resulting from the heat generated by these active elements. The temperature-compensated holding circuit will be described in detail hereinafter with reference to FIG. 2.

Continuing to refer to FIG. 1, block 3 illustrates an amplitude-discriminating circuit which compares the output of the temperature-compensated holding circuit 2 with the output of a local decoder 5 and generates time-sequential pulses, which indicate which output is larger. In the embodiment, the amplitude-discriminating circuit 3 includes a summing-amplifier 301 and a discriminator 302. The output pulses from amplitude-discriminating circuit 3 is the desired PCM output for the encoder. This output signal is supplied from an output terminal 4 to a utilization circuit, not shown.

The local decoder 5 is a digital-to-analogue converter which is responsive to the information carried by each digit of the PCM signal that is fed back from the output terminal 4 through lead 401. The local decoder 5 derives from the reference output signal of a reference voltage source 504 a binary weighted signal which is to be compared in he amplitude-discriminating circuit 3 with each of the successive samples of the input analogue signal supplied by the holding circuit 201.

According to the present invention, the level variations of the encoding characteristics resulting from variations introduced (by changes in ambient temperature) into the characteristics of the local decoder is reduced, without inducing any direct-current drift in the encoder. This is achieved by providing a suitable characteristic to the reference voltage source 504 and by effectively utilizing the above-mentioned temperature-compensated holding circuit 2. This will be explained in detail hereinafter with reference to FIGS. 5 and 6.

In the illustrated embodiment, the local decoder 5 produces a seven-digit binary code. Circuit 5 includes a logical circuit 501; a memory circuit 502; a switch circuit 503; and a weighted resistor circuit including resistors 505–511. The control-pulse source 6 produces, on output leads 601–607, digit-pulse trains whose phases successively differ from each other by one clock-pulse interval.

In the embodiment as described, the temperature-dependent variation of the characteristics of the circuit elements will usually adversely affect the encoding characteristics and deteriorate the over-all precision of the encoder. More particularly, the characteristic variation will introduce (I) direct-current drift in the encoder, (II) level variation in the encoder, and (III) deterioration of the quantization characteristics orginating with errors in the quantizing steps. The direct-current drift of the encoder produces variation of the reference of the input-output characteristics. The level variation of the encoder causes variation in the codes of the encoder output for an input analogue signal of a given level. The deterioration of the quantization characteristics originating with errors in the quantizing steps appears as a phenomenon which varies the output code (which is not desired) when the variation of the input analogue signal is less than the level difference of a nominal quantizing step or alternately the output code will not vary even when the variation exceeds the nominal quantizing step.

The present invention prevents those deteriorations of precision of an encoder mentioned above under items (I) and (II). The circuits causing the direct-current drift of the entire encoder which are subjected to temperature variations are: the direct-current drift in the amplitude-discriminating circuit 3 and, more particularly, in the summing-amplifier 301; the variation in the level of discrimination of the discriminator 302, and the direct-current drift in the local decoder 5 which is more serious when the reference voltage varies with temperature. The direct-current drift in the encoder introduced by these factors may be compensated by the temperature-compensated holding circuit 2 where the first temperature-compensation bias circuit 202 supplies to the input circuit of the holding circuit 201 a fixed direct-current component which in effect supplies the held sample value with a pedestal level. This pedestal prevents the active circuit elements of the holding circuit 201 from moving into the cutoff state even at the maximum allowable transmission level for the input analogue signal. Circuit 2 also provides a variable direct-current component which varies with temperature to compensate not only the direct-current drift of the holding circuit 201 but also, by suitably selecting the amount of variation, to compensate for direct-current drift of the whole encoder introduced by variation of ambient temperature. Incidentally, it is possible to supply an encoder with the least direct-current drift and with the ordinary encoding characteristics by subtracting from the output of the holding circuit 201 (or from the input of the summing amplifier 301) that output of the second bias circuit 203 which corresponds to the amount of the pedestal level added by the first bias circuit 202.

Figure 2:
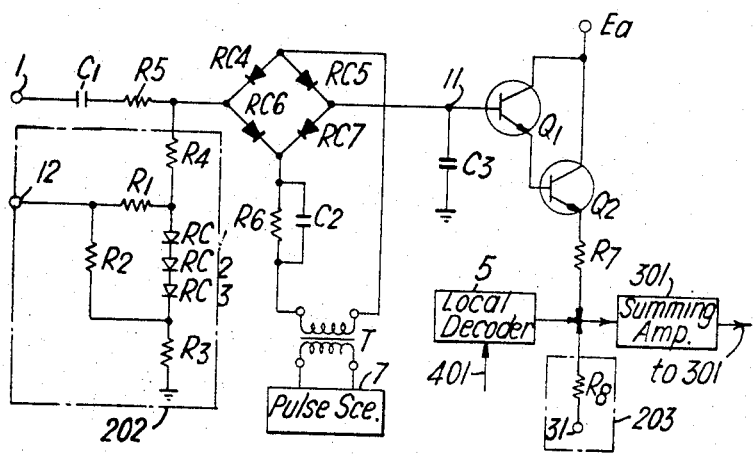
FIG. 2 is a circuit diagram of the holding circuit of this invention.

Referring to FIG. 2, there is illustrated therein a temperature-compensated holding circuit according to this invention which has: an input terminal 1 for receiving the analogue signal from source 1A of FIG. 1; a blocking capacitor $C_1$ for interrupting the direct-current coupling between source 1A of FIG. 1, supplying the analogue signal to the input terminal 1 and the main portion of the temperature-compensated holding circuit; and a resistor $R_5$ which serves to adjust the time constant for writing-in to the holding circuit portion and which, it is assumed includes the source resistance of the external circuit which supplies the analogue signal. The circuit is accompanied, as in FIG. 1, by a local decoder 5 and a summing-amplifier 301.

This holding circuit contains a memory circuit portion which includes a holding capacitor $C_3$ and the active circuit elements, transistors $Q_1$ and $Q_2$ which are connected in a Darlington configuration for providing high input impedance and relatively low output impedance. The holding circuit also has a sampling circuit portion including diodes $RC_4$–$RC_7$, a parallel circuit of a resistor $R_6$ and a capacitor $C_2$ connected to the junction of diodes $RC_6$ and $RC_7$ and a transformer T. In the sampling circuit portion, the switching circuit composed of the diodes $RC_4$–$RC_7$ is alternately switched "on" and "off" by the holding-pulse train supplied through the transformer T from the control-pulse source 7 as indicated heretofore with reference to FIG. 1. If transistors $Q_1$ and $Q_2$ are used in the holding circuit in the manner shown in FIG. 2, the emitter-base voltages of the respective transistors $Q_1$ and $Q_2$ vary with temperature. The amount of such variation is about $-2$ mv./° C. for each transistor. Thus, the direct-current component of the output current of the holding current flowing through resistor $R_7$ will change depending on the amount of variation. On the other hand, it is necessary to keep the transistor $Q_1$ and $Q_2$ in their active regions so that these transistors can operate with maximum precision even when in the presence of the maximum allowable transmission level of the input analogue signal. Consequently, the direct-current bias circuit portion is connected, according to this invention, to that junction of the diodes $RC_4$ and $RC_6$ which serves as the input circuit of the holding circuit, so as to provide the sampled value held by the capacitor $C_3$ a pedestal level which will not put the active circuit elements, namely the transistors $Q_1$ and $Q_2$, into the cut-off state even at the maximum allowable transmission level of the input analogue-signal samples. The direct-current bias circuit portion comprises resistors $R_1$–$R_4$ and diodes $RC_1$–$RC_3$, to which the direct-current voltage is supplied from a bias-input terminal 12.

If the input resistance of the holding circuit portion, viewed from a point 11 on the base circuit of the transistor $Q_1$, the output resistance of the direct-current bias circuit portion, and the direct-current electromotive force thereof are denoted by $R_h$, $R$, and $E_s$, respectively, then the voltage V stored across the holding capacitor $C_3$ when no input is supplied to the input terminal 1 is given by:

$$V = E_s(1 - R/R_h) \quad (1)$$

In view of the fact that the input resistance $R_h$ is generally sufficiently greater than the output resistance $R$, it will be possible to cause a direct-current bias given by:

$$V = E_s \quad (2)$$

to be held across the holding capacitor $C_3$. If the electromotive force $E_s$ is selected so that the difference between the maximum amplitude $V_p$ of the input alternating-current analogue signal and the held voltage V is not permitted to diminish to zero even at the maximum amplitude $V_p$, it is possible to add a pedestal level which is given by:

$$E_c = V_p - V \quad (3)$$

to the voltage held for an input analogue signal of any value. As a further consequence, it becomes possible to compensate for the direct-current drift caused (at least in the holding circuit) by temperature variation by arranging the direct-current bias circuit portion (hereinafter called the compensation bias circuit) to produce a voltage including a direct-current component that varies with temperature so as to compensate for the temperature-dependent variation of the base-emitter voltages of the transistors $Q_1$ and $Q_2$.

The compensation bias circuit portion in FIG. 2 including the resistors $R_1$–$R_4$ and the diodes $RC_1$–$RC_3$, has excellent characteristics for providing this type compensation. In this circuit, the fact that the series-connected diodes $RC_1$–$RC_3$ produce a voltage drop which varies with temperature by about $-2$ m./° C. per diode is positively utilized. Thus, it is possible to attenuate the variation of the voltage drop with temperature by any desired amount by varying, in suitable mutual relation, the resistances of the resistors $R_2$ and $R_3$ for dividing the same direct-current voltage.

Figure 3:
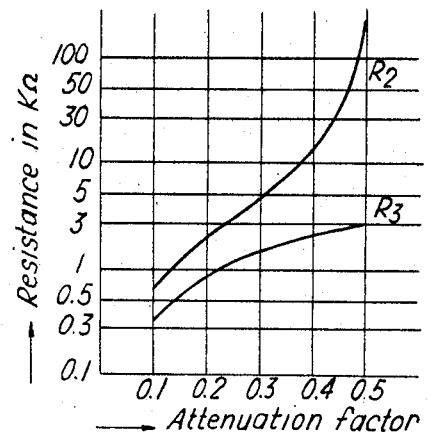
FIG. 3 is a graph which illustrates the characteristics of the temperature-compensated circuit shown in FIG. 2 which is used to determine the temperature-compensation voltage.

FIG. 3 is a graph which illustrates the characteristics of the circuit of FIG. 2. The axis of abscissas on the graph indicates the attenuation factor, while the ordinate axis indicates the resistance in kilohms. In this graph, the voltage drop of the series-connected diodes was $V = 1.68$ v., the dynamic resistance of the series-connected diodes was $r = 100$ ohms at a reference temperature, the resistance R was 3 kilohms, the voltage supplied to the bias-input terminal 12 was $E_0 = 8.5$ v., and the output voltage of the compensation bias circuit was $E_s = 5.12$ v. In FIG. 3, the attenuation constant (the abscissa axis plot) indicates that fraction of the temperature-dependent variation in the voltage drop across the series-connected diodes which appears at the output end of the compensation bias circuit. As will readily be seen from the figure, it is possible to considerably voluntarily vary the attenuation constant by selecting the mutual relation between the resistances $R_2$ and $R_3$. Incidentally, the output resistance R of the compensation bias circuit may be adjusted (independently of the determination of the attenuation constant) by the resistor $R_4$.

Figure 4:
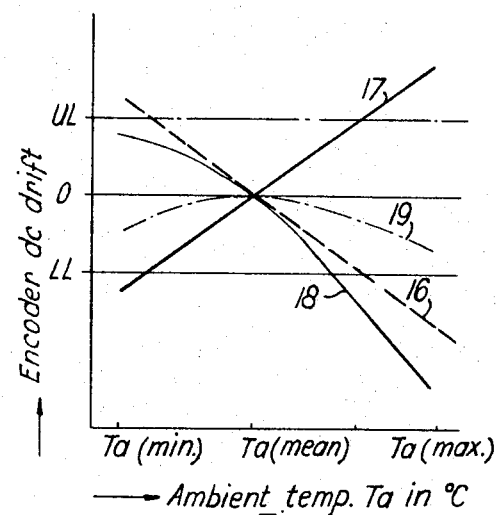
FIG. 4 is a graph which illustrates the drift characteristics of an encoder and will be used to explain the technical advantages of this invention.

FIG. 4 is a graph that illustrates the direct-current drift of a holding circuit by curve 16. In FIG. 4, the ambient temperature in ° C. is plotted on the abscissa axis against DC drift on the ordinate axis. In this case, it is possible to cancel the direct-current drift 16 if the relative temperature-dependent direct-current variation given by the temperature-compensation bias circuit is controlled to assume the form of another curve 17. With this type of temperature-compensated holding circuit, it is possible to compensate (by enlarging the direct-current variation with temperature of the compensation bias circuit) not only the direct-current drift of the holding circuit but also that of the entire encoder. For example, the direct-current drift of an encoder illustrated by a curve 18 may be converted to curve 19 which lies between an upper limit UL and a lower limit LL (on the ordinate axis) by use of a compensation bias circuit which has the temperature characteristics shown by curve 17. This enlarging of the direct-current variation is very easy to achieve with this invention.

Figure 5:
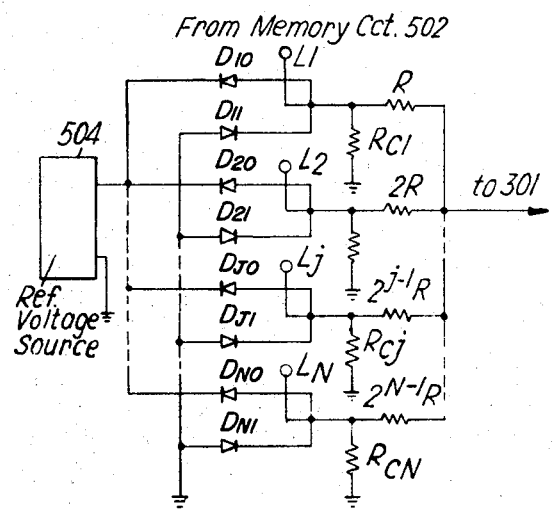
FIG. 5 is a circuit diagram of a local decoder which can also be temperature-compensated in accordance with the teachings of this invention.

In order to illustrate another feature of this invention, that portion of the local decoder 5 shown in FIG. 1, which includes the switch circuit 503, the reference voltage source 504, and the weighing resistors 505–511 may take the form of a weighed-resistor-switch circuit illustrated in FIG. 5, which is adapted to a general N-digit binary codeword. In FIG. 5: resistors R, 2R, . . ., $2^{j-1}R$ . . ., and $2^{N-1}R$ are weighed resistors; resistors $R_{C1}$, $R_{C2}$, . . ., $R_{Cj}$ . . ., and $R_{CN}$ are compensation resistors for the switch current, and are provided in accordance with an additional feature of the present invention; diodes $D_{10}$, $D_{11}$, $D_{20}$, $D_{21}$, . . ., $D_{j0}$, $D_{j1}$ . . ., $D_{N0}$, and $D_{N1}$ form diode-switch circuits; and terminals $L_1$, $L_2$ . . ., $L_j$, . . ., and $L_N$ are supplied with voltages for controlling the respective diode-switch circuits from the memory circuit 502. If the voltage supplied to the terminal $L_1$ is positive and higher than the reference voltage supplied from the reference voltage source 504, then the diode $D_{11}$ will conduct, if this voltage is negative, then diodes $D_{10}$ will conduct. The weighing resistor R and the compensation resistor $R_{C1}$ are thus either connected through the diode $D_{11}$ to the reference voltage source 504 or through the diode $D_{10}$ to ground. Similar connections are provided for the terminals $L_2$, . . ., $L_j$, . . ., and $L_N$.

In an encoder having a local decoder of the type shown in FIG. 5, compensation is necessary for the variation of the encoding level and for direct-current drift. Although the weighing-resistor-switch circuit is simple in construction and very effective in practical applications, the forward voltage drops in the conducting switching diodes adversely affects the encoding characteristics. The above-indicated additional feature of this invention very easily removes this difficulty as indicated below with reference to FIG. 6.

Figure 6:
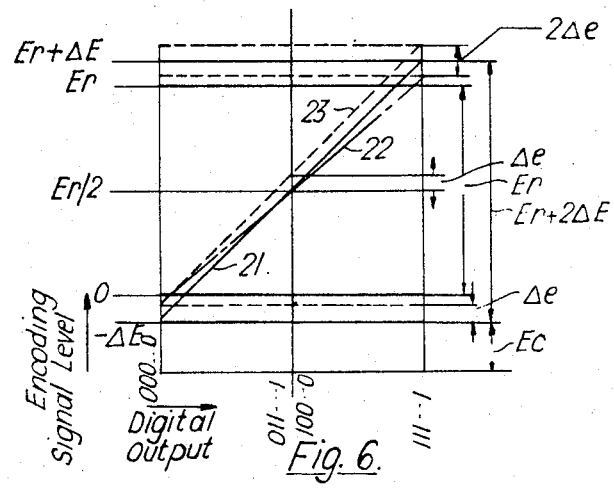
FIG. 6 illustrates encoding characteristics of the encoder and will be used to describe the operation of this invention in detail.

FIG. 6, is a plot of digital output (abscissa axis) vs. encoding signal level (ordinate axis). The encoding characteristics will be described by denoting the average residual voltage of the diodes $D_{j1}$, and $D_{j0}$ for the $j$th digit, and the temperature-dependent variation of this residual voltage by $\Delta E$ and $\Delta e$, respectively. It should be noted that the abscissa and the ordinate axis represent encoding levels ranging from 000 ... 0 to 111 ... 1 and the levels of the input analogue signal including the pedestal level $E_c$ respectively. The solid straight line 21 shows the encoding characteristics at a certain reference temperature. At the reference temperature, an input analogue signal of the level between $-0.5E_r-\Delta E$ and $0.5E_r+\Delta E_r$ is the reference voltage for the local decoder. When the ambient temperature rises above the reference temperature, the encoding characteristics shifts to another straight line 22 if the reference voltage $E_r$ remains unchanged. In this latter case, an input analogue signal of the level between $-0.5E_r-(\Delta E-\Delta e)$ and $0.5E_r+(\Delta E-\Delta e)$ will be encoded into a PCM codeword between 000 ... 0 and 111.1. This means level variation of $\Delta e$.

This invention makes it possible, in order to reduce the variation introduced into the encoding level by the above-explained mechanism, to always provide encoding characteristics equivalent to the solid line 21 shown in FIG. 6. This is achieved by: (1) so shifting the standard output of the reference voltage source by an amount that is at least nearly equal to two times the average temperature-dependent variation of the voltage drops of the diodes (this will provide a compensated encoding characteristic shown by a dotted-line curve 23 in FIG. 6); and (2) by furnishing the pedestal level which is added to the sampled value held by the temperature-compensated holding circuit of the invention with a temperature-dependent component for compensating that direct-current drift of the encoding characteristics which results from the shift of the reference output and is equal to $\Delta e$. Incidentally, it is possible, to easily compensate the fixed direct-current component of the pedestal level by means, for example, of a resistor $R_8$ and a connection to a direct-current voltage source indicated at 31 as shown in FIG. 2 and to thereby effect the encoding of mere samples of the input analogue signal.

To summarize, it will be seen that there is disclosed herein an improved temperature compensated encoder which has a holding circuit 2 having active circuit elements ($Q_1$ and $Q_2$) connected to receive and sample said information signals. Said holding circuit in turn includes temperature compensating bias circuit means (202, 203) which provides: (1) a fixed D.C. component bias level that prevents said active circuit elements ($Q_1$ and $Q_2$) from being cut-off even when maximum level value information signals are present and (2) a variable D.C. component bias which varies with temperature, said variable D.C. bias having a value sufficient to compensate for the D.C. drift of the entire encoder including the D.C. drift of said holding circuit. Encoding means 3 are provided and connected to said holding circuit 2 for encoding the samples of the information signals held by said holding circuit.

While we have described above the principles of our invention in connection with specific embodiments, it is to be clearly understood that this description is made only by way of example. Therefore, it is manifestly intended that this invention be only limited by the claims and the equivalents thereof.

What is claimed is:

1. A temperature compensated encoder comprising: an information signal source; a holding circuit having active circuit elements connected to receive and sample said information signals, said holding circuit including temperature compensating bias circuit means for providing (1) a fixed D.C. component bias level that prevents said active circuit elements from being cut-off even when maximum level value information signals are present and (2) a variable D.C. component bias which varies with temperature; encoding means connected to said holding circuit for encoding the samples of the information signals held by said holding circuit, said variable D.C. bias having a value sufficient to compensate for the D.C. drift of the entire encoder including the D.C. drift of said holding circuit.

2. A temperature compensated encoder as set forth in claim 1 wherein said holding circuit means including a sampling circuit connected to receive and sample said information signal, and a memory circuit for temporarily storing the sampled values.

3. A temperature compensated encoder as set forth in claim 1 wherein said information signal source supplies analogue signals which are to be encoded into pulse code modulation output signals; and wherein said encoding means includes: a local decoder including switching means for providing a plurality of different reference level signals and comparing means connected to receive the sampled input signals and said reference signals for providing a coded output indicative of said comparison.

4. A temperature compensated encoder as set forth in claim 3 wherein a feedback loop is provided and connected to feed back the coded output signal from said comparing means to the input to said comparing means and wherein said local decoder is connected into said feedback loop; said bias source providing a variable D.C. bias which includes compensation for temperature dependent variations of said switching means in said local decoder.

5. A temperature compensated encoder as set forth in claim 1 wherein said information source supplies PAM signals and wherein said encoder, encodes said PAM signals into pulse code modulation output signals.

6. A temperature compensated holding circuit for use in encoders which operate to convert information signals supplied from an information signal source into coded output signals, said holding circuit comprising:
   (1) sampling means, including active circuit elements, connected to said information source for sampling the information signals supplied by said source and for temporarily holding said samples; and
   (2) temperature compensating bias means connected to said sampling means for supplying to said sampling means both a fixed D.C. bias component and a variable D.C. bias component, said fixed D.C. bias having a value which prevents said active circuit elements in said sampling means from being cut-off even when maximum level value information signals are being sampled, said variable D.C. component varying with temperature and having a value sufficient to cancel the D.C. drift of the entire encoder, including the D.C. drift of said holding circuit; whereby said temperature compensating bias means prevents variations of the encoding characteristics of said encoder by providing a pedestal for the sampled value while simultaneously cancelling D.C. drift of the encoder caused by changes in temperature.

7. A temperature compensated holding circuit as set fourth in claim 6 wherein the information source supplies analogue signals, and wherein said sampling means includes a sampling circuit connected to sample said analogue signals and memory means for temporarily storing said samples.

References Cited

UNITED STATES PATENTS

| | | | |
|---|---|---|---|
| 2,876,418 | 3/1959 | Villars | 332—1 |
| 3,103,629 | 9/1963 | Damen et al. | 325—38 |
| 3,343,087 | 9/1967 | Helms | 325—42 |
| 3,067,340 | 12/1962 | Hodges | 307—310 |

ALFRED L. BRODY, *Primary Examiner.*

U.S. Cl. X.R.

332—11, 1; 328—3; 307—310, 315; 325—65, 144; 179—15